United States Patent [19]

Herh et al.

[11] Patent Number: 5,539,801
[45] Date of Patent: Jul. 23, 1996

[54] REMOVABLE TELEPHONE LINE PROTECTION MODULE FOR AN ELECTRONIC DEVICE

[75] Inventors: Ting Herh, Coral Springs; Adolfo J. Hidalgo, Plantation, both of Fla.; Patrick D. Hill, Carlock, Ill.; Paul B. Ripy, North Lauderdale, Fla.; Sheldon Steinman, Sunrise, Fla.; Richard Velez; Robert T. Wishney, both of Pembroke Pines, Fla.

[73] Assignee: Racal-Datacom, Inc., Sunrise, Fla.

[21] Appl. No.: 345,873

[22] Filed: Nov. 25, 1994

[51] Int. Cl.$^6$ .............................. H04M 1/24; H02M 1/04
[52] U.S. Cl. ..................... 379/1; 379/34; 379/412; 361/119
[58] Field of Search ..................... 379/1, 26, 32, 379/34, 412, 399, 331, 24, 30, 395, 394, 403, 404; 361/118, 119, 106, 117, 111; 364/238.5

[56] References Cited

U.S. PATENT DOCUMENTS

| | | | |
|---|---|---|---|
| 3,587,021 | 6/1971 | Baumbach | 337/32 |
| 4,149,211 | 4/1979 | DeHoff | 361/119 |
| 4,447,848 | 5/1984 | Smith | 361/124 |
| 4,624,514 | 11/1986 | Smith | 379/412 |
| 5,077,630 | 12/1991 | Bina | 361/119 |
| 5,210,677 | 5/1993 | Smith | 361/119 |
| 5,224,012 | 6/1993 | Smith | 361/119 |
| 5,315,651 | 5/1994 | Rahamim et al. | 379/412 |
| 5,384,428 | 1/1995 | Luv | 361/118 X |

OTHER PUBLICATIONS

Raychem PolySwith TR Series specification sheets, 2 pages, on PTC overcurrent protectors for telecommunications equipment, date not available.
Electrical Specifications, pp. 6–7, 14–15, Teccor Electronics, Inc., date not available.

Primary Examiner—Stephen Chin
Assistant Examiner—Paul Loomis
Attorney, Agent, or Firm—Pedro P. Hernandez

[57] ABSTRACT

The present invention provides a removable telephone line surge protection circuit (104) for use by an electronic deuce such as a modem (102). The line protection circuit (104) protects the modem (102) against telephone line surges such as those caused by lightning strikes. In one embodiment of the invention, the line protection circuit (104) interfaces with test circuitry which is preferably located within the modem (102) in order to allow the modem (102) to determine if the line protection circuit (104) is still operational while the line surge protection circuit (104) is connected to the modem (102). The present invention also provides for a removable surge protection circuit that is a testable module when connected to an electronic device having automatic module test capability as presented in one aspect of the invention. The surge protection circuit also provides for status indication of its operability in order to allow device users to make a quick determination of whether or not the module is damaged.

16 Claims, 4 Drawing Sheets

REMOVABLE TELEPHONE LINE PROTECTION MODULE FOR AN ELECTRONIC DEVICE

FIELD OF THE INVENTION

This invention relates generally to the field of telephone line protection circuits. More particularly, this invention relates to a removable telephone line protection circuit for use in electronic devices such as modems, routers and other devices which are connected to telephone lines.

BACKGROUND OF THE INVENTION

The use of surge protectors for protecting the telephone lines coming into a modem are common. In a typical prior art scenario, the surge protection circuitry is located inside of the modem or electronic device itself. This type of design however usually requires the use of tools or special equipment in order to access the surge protection circuitry if it becomes damaged. This makes the maintenance of the modem more cumbersome and time consuming.

A further problem with prior art surge protectors is that no determination of the operability of the surge protector is made by the electronic device connected to the surge protector in order to determine if the surge protector is damaged. Typically, only when the electronic device is no longer operational, such as when a modem user fails to communicate using the modem, will the user realize that the surge protection circuit might be the cause of the problem. A need thus exists in the art for a surge protection circuit and an electronic device which uses such a module which can overcome the problems associated with the prior art surge protection designs mentioned above.

DETAILED DESCRIPTION OF THE INVENTION

Figure 1:
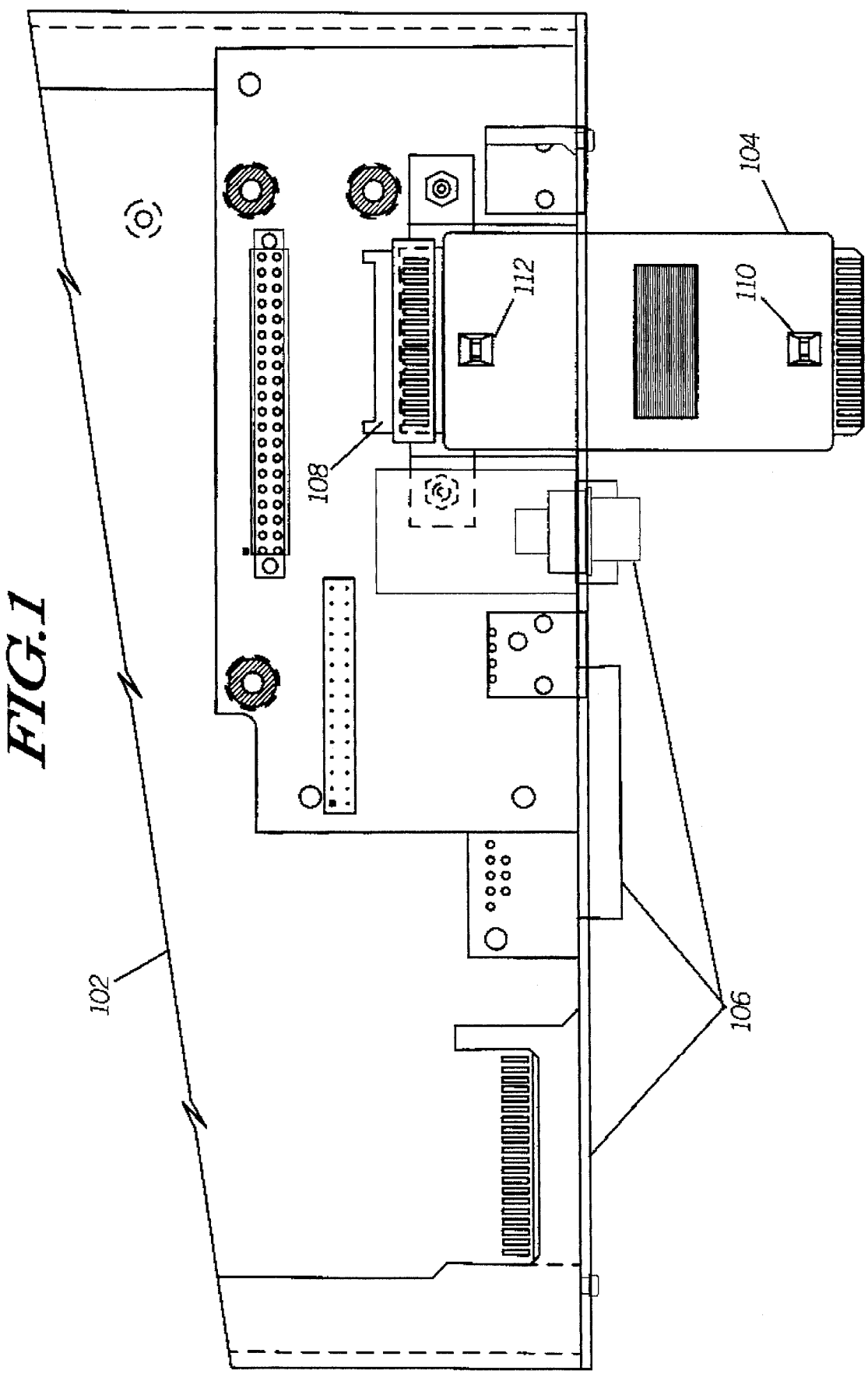
FIG. 1 shows a top cross-sectional view of a modem which includes a removable line protection circuit in accordance with the present invention.

Referring now to the drawings and in particular to FIG. 1, there is shown an electronic device which in the preferred embodiment is a modem 102. Modem 102 includes a plurality of back-panel modem connectors or ports 106 for connecting to AC lines, a data terminal such as a computer and connections for 2-wire telephone, 4-wire leased telephone lines or integrated services digital network (ISDN). Modem 102 includes a removable line protection circuit (module) 104 in accordance with the present invention. Line protection module 104 is connected to a modem connector such as edge connector 108 located within the modem. Line protection module 104 in the preferred embodiment includes two independent surge protection circuits. In case one surge protection circuit is damaged (no longer operable) one can simply turn the line protection module 104 around and reconnect the module using the other connector in order to use the other independent surge protection circuitry located inside of module 104.

A set of apertures or windows 110 and 112 are included on the protection module's housing. Windows 110 and 112 are used in order to allow for the modem user to determine if any of the two independent surge protection circuits located within module 104 are still operational. The window (110 or 112) which can be viewed when the module 104 is inserted in modem 102 is the one that corresponds to the surge protection circuitry which is presently in use. In the preferred embodiment, a status indicator such as a fuse which changes colors when blown is aligned to each of the windows 110, 112 in order to help the modem user visually determine if the particular surge circuit being used is still operational.

Figure 2:
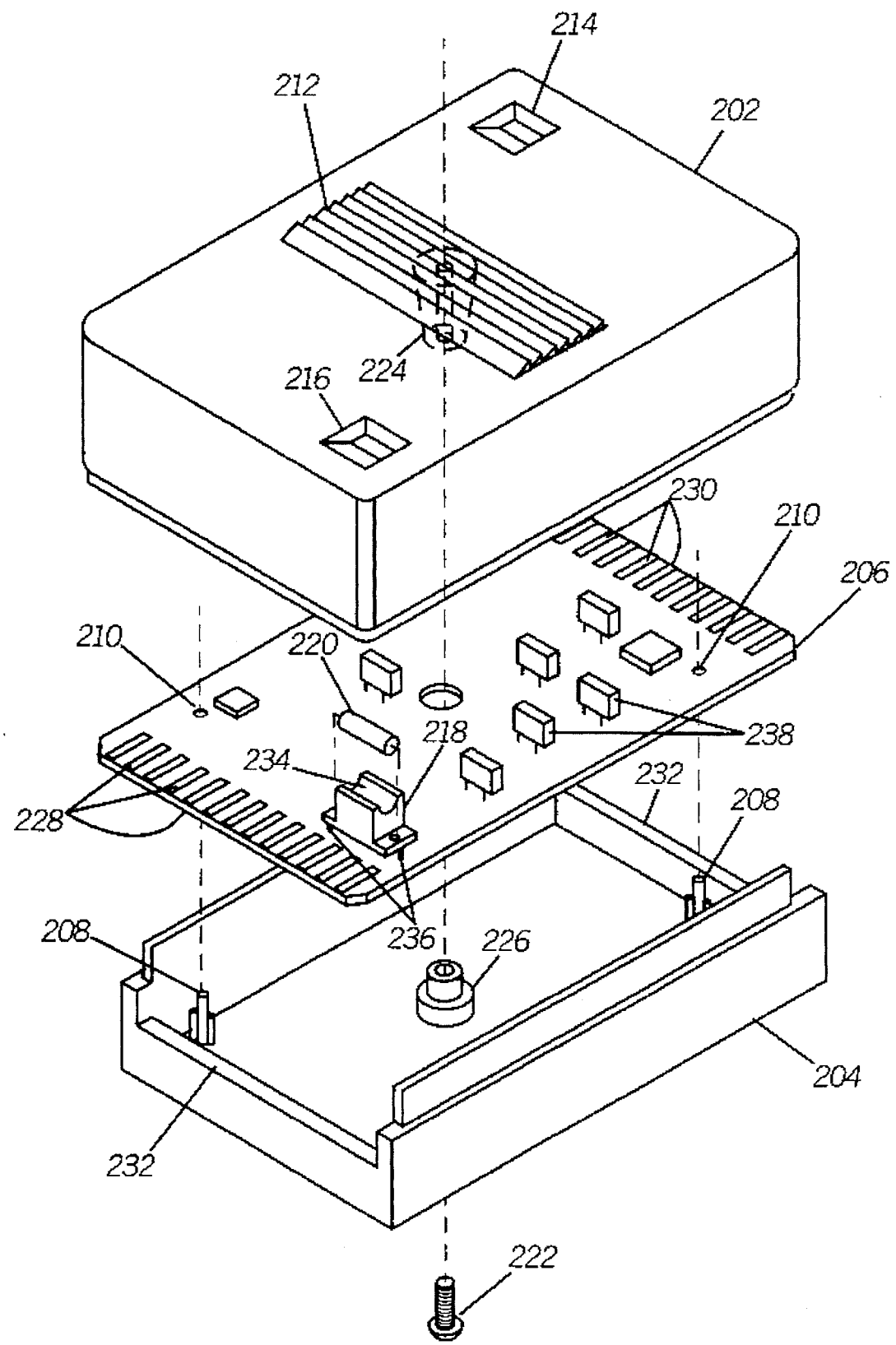
FIG. 2 shows an exploded view of the line protection circuit (module) in accordance with the present invention.

In FIG. 2, an exploded view of line protection module 104 is shown. The line protection module 104 includes first 202 and second 204 housing members. The first 202 and second 204 housing members help retain a printed circuit board 206 which carries the surge protection circuitry 236. A set of locating pins 208 and a center ledge member 226 located on the second housing member 204 help locate and center the printed circuit board 206 between the two housing members 202, 204. A thread forming screw 222 is received by a cantfievered retention member 224 which helps retain the circuit board 206 in place once the screw 222 is threaded into retention member 224.

First 228 and second 230 edge connectors which interconnect to modem connector 108 provide interconnection of the modem 102 with the surge protection circuitry located in module 104. Each of the edge connectors 228, 230 is assigned to one of the two independent surge protection circuits located in protection module 104. An elevated fuse holder 218 provides for proper presentation and alignment of fuse 220 with indication window 216. A second elevated fuse holder not shown provides proper presentation to a second fuse with indication window 214. Fuse holder 218 includes a cradle area 234 for supporting fuse 220. A set of locating posts 236 which can be integral to the fuse holder 218 or attached to the printed circuit board 206 help locate the fuse holder. Lowered side walls 232 located on the second housing member 204 allow for the edge connector contacts 228, 230 located on printed circuit board 206 to extend out of the housing members 202, 204.

Figure 3:
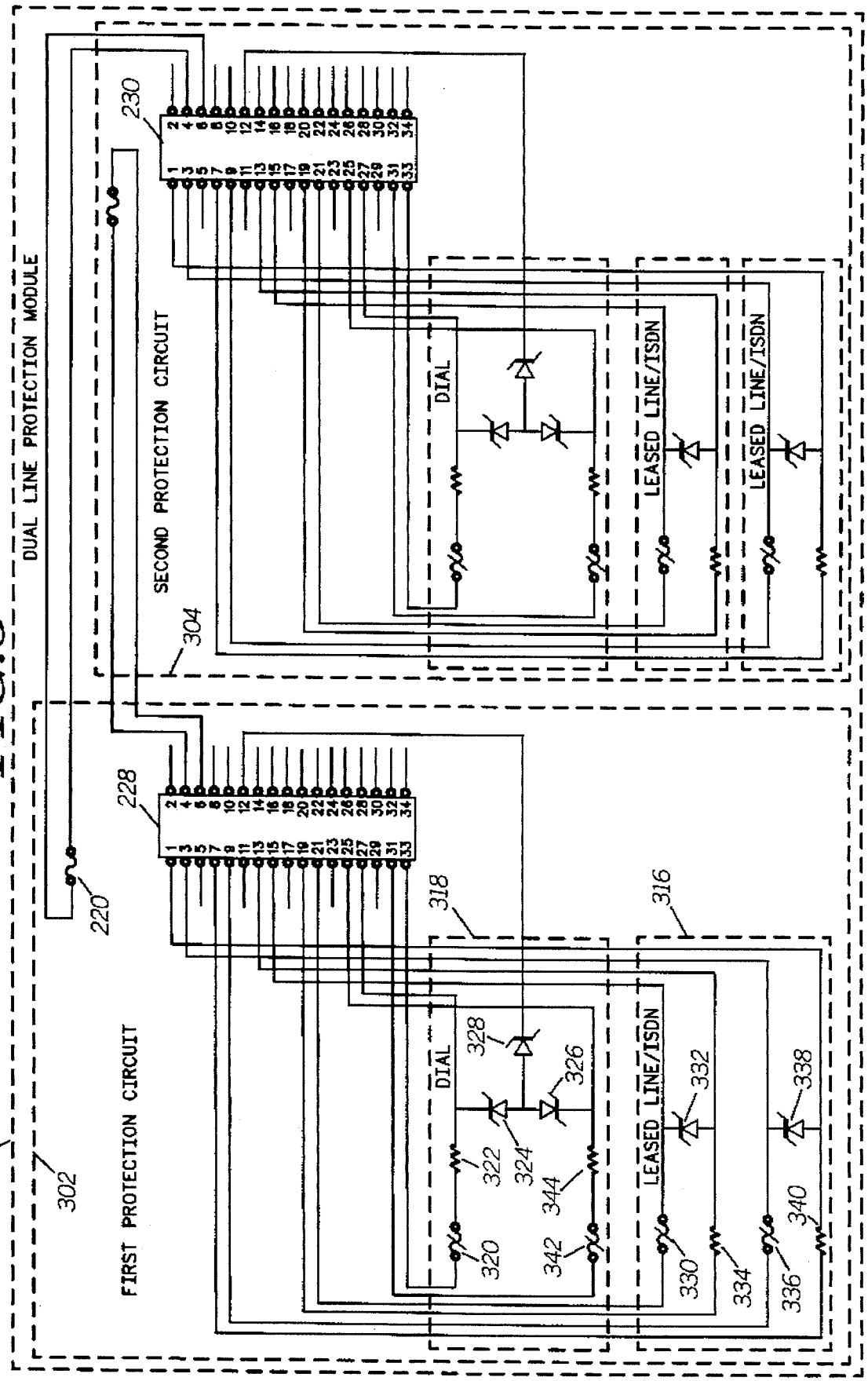
FIG. 3 shows a schematic of the line protection module in accordance with the invention.

Referring now to FIG. 3, an electronic schematic of the line protection module 104 in accordance with the present invention is shown. The protection module includes first 302 and second 304 line protection circuits which are duplicates of each other. Given that circuits 302 and 304 are duplicates of each other, only the first line protection circuit 302 will be discussed in detail. The first line protection circuit 302 is coupled to the modem 102 via a 34 pin edge connector 228 which is preferably formed by a plurality of evenly spaced metallization patterns located on one edge and both sides of printed circuit board 206. The second line protection circuit 304 is coupled to the modem electronics via edge connector 230 which is located on the side opposite to edge connector 228. Although in the preferred embodiment a line protection module having dual or duplicate circuits is used, a module having a single circuit can also be designed.

Both the Underwriter Laboratory (UL) and the Federal Communication Commission (FCC) have rules regarding electronic devices that connect to the public switched telephone network (PSTN). UL standard UL 1459 and FCC part 68 subpart D are rules on telephone line protection which have to be complied with by those interfacing to the PSTN.

There are two types of protection schemes possible, referred to as metallic or differential mode and longitudinal or common mode. Metallic protection is measured across the ring lead and tip leads of the telephone line and longitudinal protection is measured from tip lead to ground potential, or from ring lead to ground potential. The protection circuit found in the central telephone office is always both metallic and longitudinal. In modems, surge protection circuitry has traditionally been metallic only. The FCC allows an electronic device connected to the PSTN to be compliant in one of two modes, operational or non-operational. The compliance mode is determined when the test voltage is applied to the device under test. The results of the test is used to categorize the device as operational or non-operational.

In the preferred embodiment of the invention, the device used to protect against overvoltage is a SIDACTOR™ manufactured by Teccor Electronics, Inc. This overvoltage surge protection device as employed in surge protector 104 will clamp the voltage across its leads to 300 volts with a break over current of 10 microamperes. The device is rated to handle a peak surge current of 100 amperes. Overcurrent protection is provided in the preferred embodiment by a PolySwitch® manufactured by Raychem, Inc. This overcurrent protector is a positive temperature coefficient (PTC) resistor which undergoes a large and abrupt change in resistance when an overcurrent or high temperature condition heats the device above a specific point. Preferably, the overcurrent device will trigger at an electric current level of approximately 220 milliamperes.

In operation, the surge protection circuit uses a PolySwitch® with an initial resistance between approximately 7–13 ohms and a SIDACTOR™ with a leakage current of approximately 10 microamperes. When a lightning strike occurs which enters through the telephone lines, the overvoltage devices will clamp the input voltage between 350–400 volts. The overvoltage devices will pass up to 100 amperes after it damps the voltage. The overcurrent devices will switch next, when the input current increases past 220 milliamperes, the overcurrent devices increase their impedance abruptly to approximately 240 ohms. The current will decrease through the overcurrent device once the current passes the 220 milliamperes threshold needed to trigger the overcurrent devices into the current limiting mode. The overcurrent device's resistance changes within one tenth of a second, at three amperes of current flow. The maximum voltage drop supported by the overcurrent devices is 600 volts at 3 amperes. An additional fixed resistor of approximately 10 ohms is connected in series with the overcurrent devices and overvoltage devices in order to limit the peak current. Although the present invention employs specific overcurrent (PolySwitch®) and overvoltage (SIDACTOR™) devices, other types of overcurrent and overvoltage devices known in the art can be used to practice the present invention.

Circuitry 318 protects the 2-wire dial line coming into the modem 102. Overcurrent device (PolySwitch®) 320 and current limiting resistor 322 are connected in series with the tip line, while overcurrent device 342 and resistor 344 are connected in series with the ring line. This circuitry provides metallic protection. Back-to-back overvoltage protection devices (SIDACTOR™) 324 and 326 are connected between the tip and ring lines, with a third overvoltage protection device 328 being connected between the node formed by overvoltage protection devices 324 and 326 and ground potential, this circuit thereby provides both metallic and longitudinal protection.

Since modem 102 can operate not only using 2-wire telephone dial line, but also 4-wire leased line or ISDN, a separate line protection circuit is provided to protect these additional 4 interface lines. An overcurrent device 330 is connected in series with the transmit ring line, while a current limiting resistor 334 is connected in series with the transmit tip line. A series connected overcurrent device 336 is coupled to the receive tip line while a current-limiting resistor 340 is coupled to the receive ring line. Finally, an overvoltage protection device 332 is coupled between the transmit ring and tip lines, and a second overvoltage protection device 338 is coupled between the receive tip and ring lines. As discussed above, the 2-wire telephone circuit 318 provides both metallic and longitudinal surge protection, while the leased-line circuit 316 provides metallic protection only.

Figure 4:
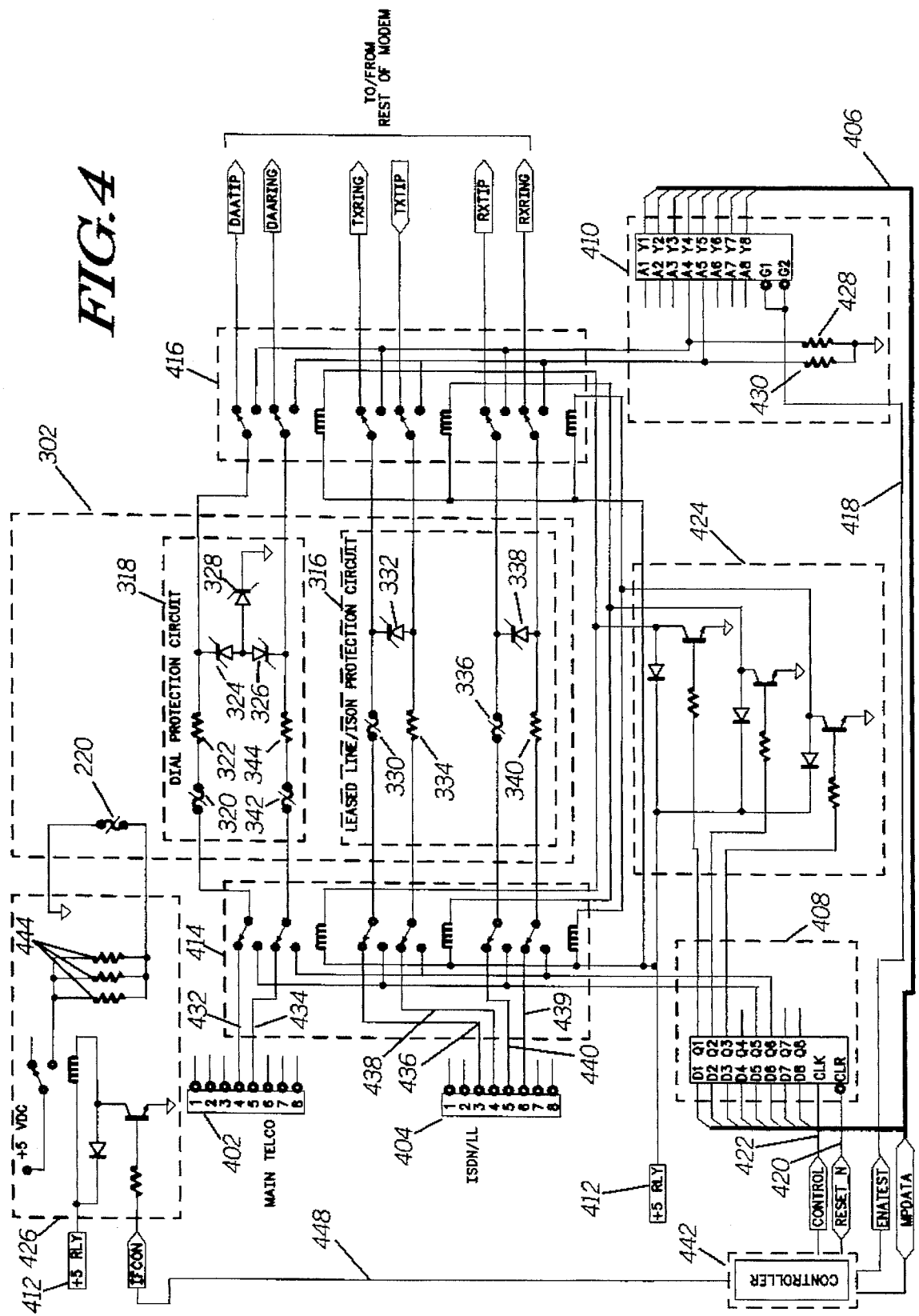
FIG. 4 shows a schematic of the line protection module coupled to test circuitry located in the modem used to in-line test the module in accordance with the present invention.

In FIG. 4, a schematic showing the removable line protection module 104 coupled to portions of the modem's surge protector test circuitry which tests the line protection module 104 in accordance with the present invention are shown. The modem's surge protection test circuitry comprises circuits 408, 410, 414, 416, 424 and a controller 444 all of which are located within modem 102. The schematic shown in FIG. 4 only shows the electronics associated with the presently active line protection circuit, which in this particular case is the first surge protection circuit 302.

The modem includes a 2-wire telephone dial line connector 402 and a 4-wire leased-line or ISDN connector 404 (shown in FIG. 1 as connectors 106). First surge protector circuit 302 is electrically coupled between the input connectors 402 and 404 and the internal modem electronics (not shown). A pair of switching circuits 414 and 416 under the control of a controller 442 are located on either end of surge protection circuit 302. Controller 442 can take the form of a microprocessor or microcontroller executing appropriate control software or other hardware which can accomplish the same tasks. Both of the switching circuits 414, 416 include a set of relays which can temporarily reroute the line surge protection circuitry 302 in order to test the surge protection electronics.

The overcurrent devices 320, 342, 330, and 336 in the surge protection circuitry will usually fail in an open circuit or high impedance condition. The limiting resistors 322, 344, 334 and 340 will always fail in an open circuit or high impedance condition. The overvoltage devices 324, 326, 328, 332 and 338 will usually fail in a shorted or very low impedance condition. The test circuitry which is part of the modem can test for these failures by testing each of the protected line for continuity as will as test for shorts caused between the lines by any overvoltage device failure.

FIG. 4 shows the telephone line interfaces 402, 404 electrically coupled through the telephone line protection circuit 302 and into the rest of the modem electronics. This is the normal operating mode of the circuit. Switching circuits 414 and 416 during normal operation of the modem, isolate the surge protection circuitry 302 from the circuitry used to test the surge protection circuitry. Sections 408 and 410 control the switching circuits 414, 416. Latch 408 is preferably also under the control of the microprocessor 442. When a clock signal to the latch 408 labeled "CONTROL" 422 goes from a logic 0 (low) to a logic 1 (high) any data on data bus 406 is captured on the output side of latch 408. The outputs of latch 408, labeled Q1–Q3 are used to control relay coil driver circuitry 424. The relay coil driver circuitry 424 provides the necessary current to drive the relay coils located in switching circuits 414 and 416. The outputs of latch 408, labeled Q5–Q6, provide a voltage source which provides test voltages through all the six protected lines 432–440 when the relays in switching circuits 414, 416 are properly energized. A reset line 420, labeled RESET_N, provides a reset signal from the controller to latch 408 in order to reset the latch.

The circuit that provides the results of the continuity test back to the controller is circuit 410. This circuit comprises a microprocessor controlled readable tri-state buffer. The results of the telephone line protection circuits continuity test is received by the inputs of circuit 410 labeled A4 and A5. A first voltage divider is formed by resistor 428 in combination with overcurrent protection device 320, or resistor 428 and overcurrent protection device 330, or resistor 428 and overcurrent protection device 336, depending which line is currently being tested. Resistor 430 in combination with overvoltage device 342 and resistor 344, or resistor 430 and resistor 334, or resistor 430 and resistor 340 form the second voltage divider. The first and second voltage divider voltage levels are then received by tri-state buffer 410 for presentation back to the controller.

When approximately 4.5 volts is applied to each of the inputs of surge protector 302, one at a time, any failures on any of the protected lines can be determined. Open or high impedance conditions can be measured if the voltage divider circuit provides the tri-state buffer 410 with a voltage level which will cause the buffer's inputs to interpret the signal as a logical 1 (e.g., any resistance greater than 1K ohms will result in this condition). The results are read by the controller 442 via data bus 406 coming from the output of buffer 410 when the read buffer signal 418, labeled ENATEST, is sent to the buffer. If the controller 442 reads a logical one from the stimulated line (e.g., the line presently being tested by applying 4.5 volts to that particular line) and a logical zero from the other non-stimulated lines, then that test path is determined to be good. However, if this condition is not met, the controller knows that their is a failure in the line being tested.

This process is performed for each of the six surge protected input lines 432–440 to be tested. During the testing of the 2-wire dial line the relays associated with the 2-wire dial line surge protection circuitry located in switching circuits 414 and 416 are energized in order to test the 2 wire surge protection circuitry. For the 4-wire leased line and ISDN lines, the relays associated with lines 436 and 438 are first energized in both switching circuits 414 and 416, then after those lines are tested, the relays associated with input lines 440 and 442 are energized in order to test those two remaining paths.

In accordance with the present invention, the controller 442 will test the surge protected lines 432–440 in accordance with a preprogrammed algorithm which will now be discussed. If the modem is configured for 2-wire dial operation, the controller 442 informs the modem's telephone interface electronics (not shown) to go "off-hook". Going "off-hook" indicates to the local telephone office to place a dial tone on the telephone lines. If there is a fault, open or short condition, the modem will not detect the presence of the dial tone. When dial tone is not detected, the algorithm will initiate a telephone line protection circuit test sequence. This sequence will check the condition of protected lines 432 and 434. The result of the test will be reported to the modem user. A visual and/or audio alarm can be generated by the modem to indicate that the protection circuit 302 has been damaged.

In the case of the 4-wire leased line situation, the test algorithm begins by indicating to the modem telephone line interface that it wants to commence transmitting data. If the telephone line interface doesn't detect Data Terminal Ready (DTR), the telephone line interface signals to the controller that DTR is not present. When DTR is not detected, the controller will initiate a telephone line test sequence in order to test lines 436–440. The results of this test are also reported to the modem user.

In the case of 2/4 wire ISDN 2B+D telephone line interconnection, the controller 442 instructs the modem to begin placing a call using the D channel control signaling. This control signaling is transmitted to the packet-switched public data network (PSPDN). This information on the D channel is referred to as call setup. The PSPDN normally responds back to the modem with a call connect message. If the ISDN firmware does not receive a call connect message, the firmware will initiate a telephone line protection circuit test sequence in order to test protected lines 436–440. The results of this are reported to the modem user either by visual and/or audio alarms.

As an added feature of the present invention, a status or operability indicator such as fuse 220 shown in FIG. 4, provides permanent indication that the surge protection module is damaged. Typically, fuses are used in prior art devices as "in-line" devices which serve to protect circuits, here fuse 220 is used as a permanent visual indicator to indicate that the surge protection circuit 302 is damaged. Circuit 426 provides the current required to blow fuse 220. A supply voltage of approximately +5 volts is supplied to circuit 426 via line 412. Once it is determined by the above testing process that the surge protection circuit 302 is damaged, the controller sends a signal via line 442, labeled IFCON, which causes the relay in circuit 426 to switch, sending a large amount of current through fuse 220 causing it to blow. The amount of current sent through fuse 220 is determined by value of resistors 444. As mentioned before, fuse 220, when it blows preferably changes from a first or normal state to a second or blown state. When the fuse 220 is blown (second state) it changes colors in order to provide a good visual indication that surge protection circuit 302 is damaged. This provides the person servicing the modem or modem user a lasting indication that the surge protection module is damaged. This is especially useful in installations in which a large number of modems are in use since many surge protection modules may be lying around. The person servicing the modem can quickly determine if the module (or portion of a module in the preferred embodiment since the module in the preferred embodiment had duplicate circuits) he is installing is good or not by simply looking at the fuse window associated with the module he is about to install.

The present invention provides for a surge protection circuit which is easily removable from the device it protects. Furthermore, the surge protection circuit can be tested while attached to the electronic device in order to determine if the surge protection circuit is still functional. In accordance with the present invention, an indication device such as a fuse which can permanently change colors is provided in order to give permanent indication that the fuse has been damaged.

While the invention has been described in conjunction with specific embodiments, it is evident that many alternatives, modifications, permutations and variations will become apparent to those skilled in the art in light of the foregoing description. For example, although in the present invention the surge protection module is used to protect a modem having more than one type of telephone service capability (i.e., 2-wire dial, 4-wire leased line, etc.) a more simplified surge protection module can be designed for a modem which supports only one type of service. Also, the present invention can be used as easily with other electronic devices which interconnect to telephone lines such as routers, bridges, etc. Accordingly, it is intended that the present invention, embrace all such alternatives, modifications and variations as fall within the scope of the appended claims.

What is claimed is:

1. A removable telephone line surge protection module for protecting an electronic device, the removable telephone line surge protection module comprising:

a housing;

a printed circuit board located within the housing;

surge protection circuitry located on the printed circuit board;

a first connector coupled to the printed circuit board for electrically connecting the removable telephone line surge protector module to the electronic device; and a status indicator coupled to the printed circuit board which changes from a first state to a second state when the electronic device sends a signal to the status indicator in response to the electronic device determining that the surge protection circuitry is damaged.

2. A removable telephone line surge protection module as defined in claim 1, wherein the status indicator comprises a fuse which changes color upon receiving the signal from the electronic device.

3. A removable telephone line surge protection module as defined in claim 2, wherein the housing includes an aperture and the fuse is aligned to the aperture by a fuse holder which is attached to the printed circuit board, the fuse holder holds the fuse in an elevated position above the printed circuit board and in alignment with the aperture in the housing.

4. A removable telephone line surge protection module as defined in claim 1, wherein the first connector is an edge connector formed by a metallization pattern disposed on the printed circuit board; and the removable line surge protector further comprises:

a second edge connector located opposite to the first connector; and the surge protection circuitry includes first and second surge protection circuits which are substantial duplicates of each other, the first surge protection circuit is electrically connected to the first edge connector and the second surge protection circuit electrically connected to the second edge connector.

5. An electronic device having a telephone line connector and electronic device circuitry, the electronic device comprising:

a controller;

a removable telephone line surge protection module having surge protection circuitry;

a device connector for receiving the removable telephone line surge protection module and connecting the surge protection circuitry electrically between the telephone line connector and the electronic device circuitry; and test circuitry responsive to the controller for electrically disconnecting the surge protection circuitry from the telephone line connector and electronic device circuitry in order to temporarily test the surge protection circuitry while the module is connected to the electronic device.

6. An electronic device as defined in claim 5, wherein the removable telephone line surge protection module includes a status indicator; and the test circuitry provides a signal to the status indicator which causes it to change from a first state to a second state if the test circuit determines that the line surge protection circuitry is damaged.

7. An electronic device as defined in claim 6, wherein the status indicator comprises a fuse which changes colors when it receives the signal from the test circuit.

8. An electronic device as defined in claim 5, wherein the removable telephone line surge protection module includes:

a housing;

a printed circuit board located within the housing having first and second duplicate surge protection circuits; and first and second connectors each coupled to a respective one of the first and second duplicate surge protection circuits for coupling one of either the first or second duplicate surge protection circuit to the device connector.

9. A modem, comprising:

an input port;

a modem module connector;

a removable telephone line surge protection module having surge protection circuitry and a module connector for electrically coupling the removable telephone line surge protection module to the modem module connector, the surge protection circuitry protecting the modem from disturbances entering via the input port, the removable line surge protection module further including a housing and a printed circuit board located within the housing for carrying the surge protection circuitry;

a controller coupled to the module connector;

test circuitry responsive to the controller for testing the operability of the surge protection circuitry while the removable line surge protection module is coupled to the modem connector; and wherein the input port comprises a 2-wire dial line port for connecting the modem to 2-wire dial line telephone service; and the controller causes the modem to go "off-hook" in order to determine if dial tone is available via the 2-wire dial line port, and if the controller determines that no dial tone is present on the 2-wire dial line port, the controller causes the test circuitry to test the operability of the surge protection circuitry.

10. A modem as defined in claim 9, wherein the removable line surge protection module further comprises a status indicator; and the controller sends a signal to the status indicator if the test circuitry determines that the surge protection circuitry is damaged.

11. A modem, comprising:

an input port;

a modem module connector;

a removable telephone line surge protection module having surge protection circuitry and a module connector for electrically coupling the removable telephone line surge protection module to the modem module connector, the surge protection circuitry protecting the modem from disturbances entering via the input port, the removable line surge protection module further including a housing and a printed circuit board located within the housing for carrying the surge protection circuitry;

a controller coupled to the module connector;

test circuitry responsive to the controller for testing the operability of the surge protection circuitry while the removable line surge protection module is coupled to the modem connector;

the input port comprises a port for connecting the modem to 4-wire leased line service; and the controller determines if a data terminal ready (DTR) signal is received and the controller upon not receiving the DTR signal within a predetermined period of time causes the test circuitry to test the operability of the surge protection circuitry.

12. A modem, comprising:

an ISDN port for connecting the modem to integrated services digital network (ISDN) services;

a modem module connector;

a removable telephone line surge protection module having surge protection circuitry and a module connector for electrically coupling the removable telephone line surge protection module to the modem module connector, the surge protection circuitry protecting the modem from disturbances entering via the ISDN port, the removable line surge protection module further including a housing and a printed circuit board located within the housing for carrying the surge protection circuitry;

a controller coupled to the module connector;

test circuitry responsive to the controller for testing the operability of the surge protection circuitry while the removable line surge protection module is coupled to the modem connector; and the controller instructs the modem to commence placing a call via the ISDN port and the controller upon not receiving a call connect message via the ISDN port causes the test circuitry to test the operability of the surge protection circuitry.

13. A modem, comprising:

an telephone line interface port;

surge protection circuitry for protecting the modem from disturbances entering via the telephone line interface port;

a controller;

test circuitry responsive to the controller for testing the operability of the surge protection circuitry; and the controller can cause the modem to go "off-hook" in order to determine if dial tone is available via the telephone line interface port and if the controller determines that no dial tone is present on the telephone line interface port, the controller causes the test circuitry to test the operability of the surge protection circuitry.

14. A modem as defined in claim 13, wherein the surge protection circuitry is housed in a removable module which can be electrically disconnected from the modem.

15. An electronic device, comprising:

an input interface port for receiving a signal;

surge protection circuitry for protecting the electronic device from disturbances entering via the input interface port;

a controller coupled to the interface port;

test circuitry responsive to the controller for testing the operability of the surge protection circuitry; and the controller can determine if the signal is received at the input interface port and if the controller determines that the signal is not present at the input interface port, the controller causes the test circuitry to test the operability of the surge protection circuitry.

16. An electronic device as defined in claim 15, wherein the test circuitry includes:

a switching circuit responsive to the controller for electrically rerouting the surge protection circuitry in order to test it.

* * * * *